(No Model.)

I. W. BATES.
HORSE BLANKET FASTENING.

No. 414,672. Patented Nov. 12, 1889.

Witnesses:
Edw. H. Deavitt
R. R. River

Inventor:
Irving W. Bates
By T. J. Deavitt
his Attorney

UNITED STATES PATENT OFFICE.

IRVING W. BATES, OF BARRE, VERMONT.

HORSE-BLANKET FASTENING.

SPECIFICATION forming part of Letters Patent No. 414,672, dated November 12, 1889.

Application filed May 29, 1889. Serial No. 312,658. (No model.)

*To all whom it may concern:*

Be it known that I, IRVING W. BATES, a citizen of the United States, residing at Barre, in the county of Washington and State of Vermont, have invented a new and useful Improvement in Horse-Blanket Fastenings, of which the following is a specification.

The object of my invention is to provide a fastening easily operated, safe, and will not unfasten or become detached when in use; and it consists of the hook and eye, as hereinafter described.

Figure 1:
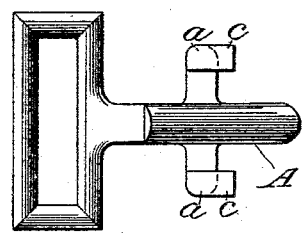
Figure 2:
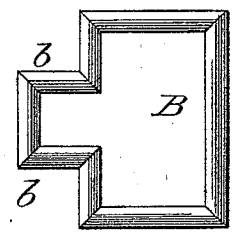
Figure 3:
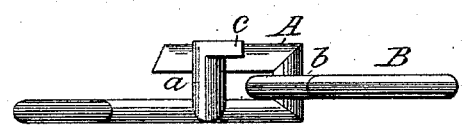

In the accompanying drawings, Figure 1 represents a perspective view of the hook. Fig. 2 represents a perspective view of the eye, and Fig. 3 represents a side elevation of the hook and eye attached together.

In the drawings, A represents the hook, and B the eye.

$a$ $a$ are guards on either side the hook, preventing any eye catching onto the hook, except it be in the shape herein described. The extension in the ring of the eye, as shown in the drawings at $b$ $b$, is of a shape that will only pass between the guards $a$ $a$ when the opposite side of the eye B is elevated. Attach the eye to the blanket with a short strap to allow it to be more easily elevated to pass between the guards of the hook in fastening and unfastening. At the ends of guards $a$ $a$ are slight projections or lips $c$ $c$, as shown in the drawings, extending toward the eye to prevent any casual detaching of the eye. The eye is first pressed against guards $a$ $a$ in any attempt to become detached, and projections $c$ $c$ resist elevating the end of the eye, securely keeping it in its proper place. The hook extending slightly beyond the guards prevents the eye from becoming detached when pressed against the guards and on depression of the front of the eye. The eye B, constructed in the form shown in the drawings, can only be detached from the hook by elevating its outer rim to a proper degree to allow it (the extension $b$ $b$) to pass between the guards $a$ $a$.

To use my invention, attach the hook to one side end of the horse-blanket and the eye to the other side and bring the sides of the blanket together at the horse's breast and connect the hook and eye, as hereinbefore mentioned, when it is impossible for the blanket to become unfastened, by accident or otherwise, until desired.

My invention may also be used in different parts of a harness where a strap and a trace or two straps need connecting. It may also be used on a coat or cloak in lieu of buttons or other fastenings, and it may also be used for attaching the tug to the whiffletree.

Having thus described my invention, what I claim as new, and desire to secure by Letters Patent, is—

1. In combination with a hook having guards extending laterally therefrom, an eye having a forward extension, said guards and extension operating together to prevent the accidental separation of said hook and eye, substantially as set forth.

2. Hook A, with guards $a$ $a$ and projections $c$ $c$, in combination with eye B and extension $b$ $b$, when arranged as shown and described.

IRVING W. BATES.

Witnesses:
THOMAS J. DEAVITT,
EDWARD H. DEAVITT.